United States Patent [19]

Eck et al.

[11] Patent Number: 4,542,184

[45] Date of Patent: Sep. 17, 1985

[54] PROCESS FOR AQUEOUS POLYMER DISPERSION BY POLYMERIZING UNSATURATED ETHYLENIC COMPOUNDS

[75] Inventors: Herbert Eck; Reinhard Jira, both of Burghausen, Fed. Rep. of Germany

[73] Assignee: Wacker-Chemie GmbH, Fed. Rep. of Germany

[21] Appl. No.: 625,668

[22] Filed: Jun. 28, 1984

[30] Foreign Application Priority Data

Jul. 1, 1983 [DE] Fed. Rep. of Germany ....... 3323810

[51] Int. Cl.$^4$ ............ C08F 2/20; C08F 4/32; C08F 4/40; C08J 3/06
[52] U.S. Cl. .................. 524/827; 524/704; 524/797; 524/804; 526/208; 526/227; 526/228; 526/910; 526/911; 526/915
[58] Field of Search .............. 524/827, 804, 704, 797; 526/208, 227, 228, 910, 911, 915

[56] References Cited

U.S. PATENT DOCUMENTS

| | | | |
|---|---|---|---|
| 1,756,943 | 5/1930 | Frankenburger et al. | 524/797 |
| 2,388,602 | 11/1945 | Kiar | 524/704 |
| 2,393,438 | 1/1946 | Weisberg et al. | 524/704 |
| 2,833,754 | 5/1958 | Richards et al. | 524/704 |
| 2,836,585 | 5/1958 | Hill | 524/704 |
| 3,784,491 | 1/1974 | Pozorski | 524/704 |
| 4,118,556 | 10/1978 | König et al. | 526/915 |

FOREIGN PATENT DOCUMENTS 543252  7/1957  Canada ................. 524/797

*Primary Examiner*—Ronald W. Griffin
*Attorney, Agent, or Firm*—Bierman, Peroff & Muserlian

[57] ABSTRACT

A process for the preparation of aqueous polymer dispersions comprising polymerizing compounds with unsaturated ethylenic bonds at a temperature of 10° to 100° C. in the presence of an at least partially water-soluble free-radical initiator and at least one water-soluble protein and optionally present conventional adjuvants with the starting mixture containing not more than 40% of the total monomers and the remaining monomer being added by metering during the polymerization, the initiators being at least one member of the group consisting of ketone peroxides and organic hydroperoxides in an amount of at least 30 mmol per kg of total monomer mixture and optionally present water-soluble reducing agents and the amount of protein being at least 3% by weight based on the total monomer weight and at least 30% by weight is added during the polymerization and the isoelectric point of the protein is not reached or exceeded during polymerization.

12 Claims, No Drawings

PROCESS FOR AQUEOUS POLYMER DISPERSION BY POLYMERIZING UNSATURATED ETHYLENIC COMPOUNDS

STATE OF THE ART

The use of gelatin or casein as a protective colloid in the preparation of aqueous polymer dispersions has been proposed several times. For example, the U.S. No. 2,388,602 describes a process for the preparation of aqueous vinyl ester polymer dispersions in which the monomer is emulsified in an aqueous solution of an emulsifying agent, a catalyst and a protective colloid such as gelatin, and is then polymerized with stirring. DE-A-21 41 864 describes a process in which vinyl chloride and ethylene as well as optional additional comonomers are polymerized with the use of inorganic, water-soluble peroxide initiators whereby ethylene is introduced under pressure over the aqueous reaction mixture and vinyl chloride and the other comonomers are metered in over a period of at least six hours. An emulsion stabilizer is used which is kept to a minimum, e.g. below 0.4%, calculated with respect to vinyl chloride and the other comonomers and the initial addition of a seed latex to the reaction vessel is also crucial for this process.

Since the presence of an emulsifying agent is undesirable for various applications of polymer dispersions, a process for the preparation of aqueous polymer dispersions that will work without the addition of emulsifying agents for the polymerization has been sought. Moreover, while still producing dispersions free of grit and coagulum that possess the stability required today against, e.g., shearing, temperature influences, electrolyte addition.

OBJECTS OF THE INVENTION

It is an object of the invention to provide a process for the preparation of aqueous polymer dispersions by polymerization of compounds with unsaturated ethylene bonds using at least partially water-soluble, free-radical initiators at reaction temperatures of 10° to 100° C. in the presence of at least one water-soluble protein and optionally, additional, conventional additives, by starting with not more than 40 weight % of the total monomers in the reaction vessel and adding the remaining monomers during the polymerization, characterized by the fact that ketone peroxides and/or organic hydroperoxides are used as initiators, with optionally present water-soluble reducing agents in amounts of at least 0.3 weight % per 1 kg of the total monomer mixture, and that the protein is used in amounts of at least 3 weight % based on the total weight of the monomers, of which at least 30 weight % is added during the polymerization, and the polymerization is programmed to prevent meeting or exceeding the isoelectric point(s) of the protein(s).

It is another object of the invention to provide novel aqueous dispersions particularly adapted to produce polymer powders which are easily redispersible.

These and other objects and advantages of the invention will become obvious from the following detailed description.

THE INVENTION

The novel process of the invention for the preparation of aqueous polymer dispersions comprising polymerizing compounds with unsaturated ethylenic bonds at a temperature of 10° to 100° C. in the presence of an at least partially water-soluble free-radical initiator and at least one water-soluble protein and optionally present conventional adjuvants with the starting mixture containing not more than 40% of the total monomers and the remaining monomer being added by metering during the polymerization, the initiators being at least one member of the group consisting of ketone peroxides and organic hydroperoxides in an amount of at least 30 mmol per kg of total monomer mixture and optionally present water-soluble reducing agents and the amount of protein being at least 3% by weight based on the total monomer weight and at least 30% by weight is added during the polymerization and the isoelectric point of the protein is not reached or exceeded during polymerization.

Examples of compounds with ethylenic unsaturation are optionally substituted styrene, (meth) acrylates with branched or straight-chain, saturated alcohols of 1 to 18 carbon atoms, (meth) acrylonitrile, dienes, vinyl or allyl esters of aliphatic, araliphatic or aromatic carboxylic acids of 1 to 19 carbon atoms and vinyl halides. They can in many cases be polymerized individually or, if the parameters of copolymerization permit, copolymerized in admixture, if needed with other monomers, especially with alkenes such as ethylene, propylene or isobutylene, with acrylic acid, methacrylic acid, itaconic acid, crotonic acid, fumaric acid and maleic acid, their mono- and/or diesters with the alcohols mentioned above, their amides or nitriles.

Vinyl sulfonates, monoesters of di- or polyhydroxyl compounds with (meth)acrylic acid or crotonic acid, N-vinyl-2-pyrrolidone, vinyl-pyridine, N-vinyl lactones, vinyl- or allyl(di) acetyl acetate, vinyl- or (meth)acryloylalkoxy silanes, vinyl or allyl compounds of glycidyl alcohol, α-chloroalkylcarboxylic acids and dichlorotrizines as well as olefinically unsaturated N-methylol amides such as N-methylol (meth)acrylamide, N-methylol allyl carbamate, N-methylol allyl ether, Mannich bases, N-methylol ester and N-methylol ether of N-methylol (meth)acrylamide may also be used as comonomers.

Examples of bi- or polyfunctional comonomers include: divinyl and diallyl ethers of glycols, divinyl and diallyl esters of saturated dicarboxylic acids, polyvinyl and polyallyl esters of polycarboxylic acids, di- and polyesters of di- and polyhydroxyl compounds with (meth)acrylic acid, vinyl and allyl esters of (meth)acrylic, crotonic, maleic and fumaric acids and divinyl benzene. The said comonomers can be copolymerized with the initially mentioned monomers or their mixtures if the parameters of copolymerization and the desired characteristics of the dispersion of the copolymer permit.

Examples of monomers that can be homopolymerized or copolymerized according to the invention include styrene, chlorostyrene, methylstyrene, methyl (meth) acrylate, ethyl(meth)acrylate, propyl (meth)acrylate, butyl (meth)acrylate, ethylhexyl (meth) acrylate, lauryl (meth)acrylate, butadiene, isoprene, cyclobutadiene, vinylidene chloride, vinyl formate, vinyl acetate, vinyl propionate, vinyl hexanoate, vinyl laurates, vinyl stearate, the allyl esters corresponding to the mentioned vinyl esters, vinyl esters of alkyl carboxylic acids branched in the α position, which are prepared by the so-called Koch synthesis (esters of Versatic ® acids, Shell AG), vinyl fluoride, vinyl chloride and vinyl bromide.

Suitable at least partially water-soluble, free-radical initiators which are added as redox-initiator system, preferably in combination with water-soluble reducing agents, are ketone peroxides, particularly acetylacetone peroxide, and/or organic hydroperoxides with the use of alkyl hydroperoxides of up to 8 carbon atoms and/or aralkyl hydroperoxides of 6 to 15 carbon atoms being preferred. Specific initiators include isopropyl hydroperoxide, tert-.butyl hydroperoxide, cumene hydroperoxide, diisopropylphenyl hydroperoxide, pinane hydroperoxide, p-nitrocumene hydroperoxide, p-tert-.butylphenyl hydroxperoxide, tert-amyl hydroperoxide, 2,5-dimethyl-hexan-2,5-dihydroperoxide.

Preferred reducing agents include reducing sulfur compounds, especially salts of sulfoxylic acid and sulfurous acid, as well as ascorbic acid. Sodium and zinc formaldehyde sulfoxylate, sodium bisulfite and sodium sulfite are specific preferred sulfur compounds.

The said oxidizing and reducing agents can be used alone or as mixtures and the oxidizing component is preferably used in an excess with respect to the reducing component. This may be achieved e.g., by placing the oxidizing agent completely or partly in the reaction vessel and metering in the reducing agent and, if appropriate, the remainder of the oxidizing component, preferably at the rate at which they are consumed during the polymerization. However, it is understood that both components of the redox system can also be added by metering during polymerization.

The peroxide initiator is used in amounts of at least 30 mmol, preferably at least 45 mmol, per kg of the total monomer mixture and the amount of the optionally used reducing agent is preferably 15 to 95 mol %, especially 80 mol %, calculated with respect to the peroxide compound. In this case. the water and the reaction components and compounds dissolved or dispersed in it are called the reaction mixture. The upper limit of the concentration of the initiator depends on the type of monomer used and especially on the chosen reaction temperature and the intended degree of polymerization. The protective colloid also has a certain influence on the amount of initiator to be used but the optimal amounts can be readily determined by a few preliminary experiments. Generally, 2 weight %, calculated with respect to the total amount of monomers, will be adequate.

Useful protective colloids, singly or in mixture but preferably singly, are proteins soluble in water or made soluble in water by well-known degradation methods. Examples of such suitable proteins are animal proteins such as gelatin, casein, fish proteins and fish protein concentrates; vegetable proteins obtained e.g., from leaf albumen concentrates, wheat, potatoes, rice, tapioca, proteins from oil seeds such as from soy beans, peanuts, sunflower seeds, cotton seed, rape seed, coconuts; and proteins from microorganism that utilize, e.g., starch, cellulose, $CO_2$, hydrocarbons, alcohols etc. as a carbon source.

At least 30 weight % of the total amount of protein are added during the polymerization and according to a preferred mode at least 60 weight % of the total amount is added to the reaction mixture simultaneously with the monomer metering. It is also possible in this case to emulsify the monomers with the proteins and to meter this pre-emulsion subsequently. According to another preferred embodiment the entire amount of protein can be metered as part of the mentioned pre-emulsion and in this case, the addition begins preferably when the reaction mixture reaches a solids content of 20 weight % especially 10 weight % based on the total weight of the reaction mixture.

The protein of the protective colloids is added preferably in amounts of at least 3 weight %, calculated with respect to the total weight of the monomer mixture. The upper limit for the amount of protective colloid is determined practically by the intended use of the final dispersion rather than by the polymerization process. Naturally, the viscosity of the proteins also limits the amount that can be added and this becomes apparent, e.g., from the fact that this limit can be extended further by the use of kneading units for the polymerization.

High-viscosity protein types such as gelatin 160 B, can be used in amounts of preferably up to 10 weight %, for example while very low-viscosity types, such as Gelita Sol E, are used, preferably up to 100 weight %, especially up to 50 weight %, based on the total monomer weight. Protective colloids of viscosities between those mentioned consequently can be used in amounts preferably from 10 to 50 weight %. Some types of starch are known to inhibit polymerization. They are preferably avoided or added only in small amounts and it is advisable to test the suitability in a small-scale preliminary trial.

The polymerization process of the invention is performed at 10° to 100° C., preferably 35° to 80° C., and preferably at pressures of up to 200 bar. When no ethylene is used, the polymerization is preferably performed at not more than the autogenous pressure of the monomers at the selected reaction temperature. When ethylene is used, pressures of up to 100 bar are adequate in an especially preferred practical example.

When ethylene is used in the polymerization, it can be placed completely in the reaction vessel at the start, or part of it can be added during polymerization. A specific, desired pressure is preferably set before the polymerization and then kept constant throughout the polymerization, if needed by further addition of ethylene under pressure. Naturally, the ethylene pressure can be varied during the polymerization reaction, if this is desired such as for the preparation of polymers with varying composition.

The other monomers or comonomers are placed in the reaction vessel at the beginning in amounts not exceeding 40 weight % of the total weight with the remainder being added during the polymerization, preferably at the rate of consumption. The addition can be separately, as a mixture and/or as a pre-emulsion. Maintaining the total monomer concentration of these other monomers in the reaction mixture below 20 weight %, preferably at not more than 15 weight %, of the total weight of the reaction mixture was also found to be advantageous. When ethylene is copolymerized, particularly when copolymers with more than 10 weight % ethylene units added by polymerization are desired, the total concentration of these other comonomers, i.e. of the unsaturated esters, halogen-substituted ethylenes etc., is kept preferably at not more than ethylenes etc., is kept preferably at not more than 10 weight %, especially not more than 5 weight %, of the total weight of the reaction mixture. The monomers may be added individually, mixed and/or as pre-emulsion or, if needed, as aqueous solutions.

The polymerization can be performed at a pH from approx. 2 to approx. 10, but those pH values are excluded that correspond to the isoelectric point of the protein that is used. Reaching such a value causes several proteins such as casein to coagulate and, generally thus also leads to coagulation of the polymer. The protective colloid action of other proteins such as gelatins is strongly reduced in such cases, frequently resulting also in coagulation.

The protein is preferably polymerized on the basic side of the isoelectric point since the requirement for protective colloids is lower in this range than on the acid side. The pH can be regulated in the usual manner such as by addition of buffers in conventional amounts and such conventional buffers are water-soluble hydrogen salts of polybasic acids like alkali metal salts of phosphoric acid, sulfuric acid and carbonic acid, namely sodium bicarbonate, sodium bisulfate, disodium hydrogen phosphate and similar compounds.

Other optional conventional adjuvants used in the usual amounts are molecular weight regulators, protective colloids such as polyvinyl alcohols such as partially saponified polyvinyl acetate, cellulose derivatives and similar substances and emulsifying agents. However, these dispersing adjuvants and dispersion stabilizers are added, if at all, to the final dispersion after the end of the polymerization since they may otherwise frequently enter in an undesirable manner into the polymerization or modify the products in an undesirable way. Upon the completion of the polymerization, other usual adjuvants can be added in the usual amounts to the dispersions obtained by the invention and include film-forming adjuvants, softening agents, pesticides, stabilizers against thermal or electromagnetic damage a.m.m.

Surprisingly, polymer dispersions with good properties are prepared with good reproducibility by the process of the invention. Until now, no readily reproducible process meeting the present technical requirements was known, which may be due to the easy grafting, ready interference with the tertiary structure, and the otherwise high reactivity of the proteins. Particularly surprising is the fact that every conventional dispersing adjuvants such as anionic, cationic, nonionic or amphoteric emulsifying agents, other protective colloids and known comonomers with a stabilizing effect is superfluous in the process of the invention.

The dispersions prepared by the invention can be used as such for the preparation of adhesives such as especially paper, foil, water resistant wood glues, as paint, textile or paper filler, in the construction industry such as adjuvant to hydraulically setting materials, especially stable cement and concrete materials, but particularly for the preparation of redispersible plastic powders. These powders are produced by spray-drying or drum-drying or suction-filter-drying by known procedures and thus do not need to be described here in detail with the use of the powders, based on the dispersions of the invention. However, the polymers can also be precipitated or isolated by other known methods.

In the following examples there are described several preferred embodiments to illustrate the invention. However, it should be understood that the invention is not intended to be limited to the specific embodiments.

EXAMPLES

In the following examples reported in the Tables, the amounts and concentrations are by weight and the percentages of the components of the initiator systems, monomers and protein are calculated on total monomer weight without ethylene and the solids content and remaining monomers are calculated on the total weight of the dispersions. The wet residue is reported on grams per 1.5 kg batch and the viscosities were determined with Brookfield viscosimeter in mPas. The mean particle sizes were measured with a nanosizer in nm and was recorded after dimentation of the particle size distribution.

Examples 1 to 12 illustrate the process of the invention and Examples A to G are comparison examples to show the advantagous features of the process. Water, starch, if needed portions of the catalyst system, if needed portions of the monomers and, if needed, additives were placed in a cylindrical reaction vessel with a bottom stirrer, a reflux condenser, a thermometer and feeding funnels for the initiator, monomer mixture and buffer solution as well as an attachment for the removal of samples. The mixture was stirred to raise it up to the reaction temperature and the remaining monomers, catalyst system and buffer were added by metering over about 2 hours. Upon the completion of the polymerization, the material was allowed to after-polymerize, if needed, for 30 minutes in the known manner with continued addition of a water-soluble initiator.

Metering of the monomers except ethylene was adjusted so that for operating procedure A: the concentration of the monomers in the reaction mixture was maintained between 20 and 15 weight %: for operating procedure B, between 5 and 10 weight %: and for operating procedure C, at barely 5 weight %. The metering of the monomers as a pre-emulsion is indicated as VE wherein the monomers were emulsified in an aqueous solution of the protective colloid or protein. Further details of the examples can be found in the following table. the abbreviations are explained below:

| V | placed in the reaction vessel | | d. metered |
|---|---|---|---|
| AA | acrylamide | OF | Bis(2-ethylhexyl) fumarate |
| AAA | allyl acetoacetate | S | styrene |
| AB | butyl acrylate | Si | vinyl trimethoxysilane |
| AMA | allyl methacrylate | VA | vinyl acetate |
| AS | acrylic acid | VC | vinyl chloride |
| E | ethylene | Veo | VeoVa(R)10, Vinyl- |
| HEA | hydroxyethyl acrylate | Veo | versatat(R) |
| TBHP | tert-butyl hydroperoxide | $H_2O_2$ | hydrogen peroxide |
| DBP | dibenzoyl peroxide | CHP | cumul hydroperoxide |
| PHP | pinane hydroperoxide | NFS | sodium formaldehyde hydrosulfoxylate |
| KPS | potassium persulfate | | |
| F.G. | solids content | NS | sodium sulfite |
| | | R.M. | remaining monomer content |

Commercial gelatin types (Deutsche Gelatine-Fabriken, Eberbach) and commercial proteins used in the examples were as follows:

| I | Getreideprotein L339 (cereal protein) isoelectr. point (i.P.) at pH 6-7 mol. weight 20,000–30,000; Roquette; |
|---|---|
| II | Gelita Sol E non-gelling, strongly degradated gelatin, (i.P.) 4.7–5.2; |
| III | Casinella QS casein, Maggle, Wasserburg; i.P. approx. 4.6; |
| IV | Gelatine 160 B-gelatin digested with base, 160 Bloom, i.P. 4–7–5.2; |
| V | Gelatine 80 B gelatin digested with base, 80 Bloom; i.P. 4.7–5.2 |

| No. | Monomers (%) | Type of Proteintype (%) | Catalyst system (%) | Operating Procedure |
|---|---|---|---|---|
| 1 | VA; d | I (1v + 4d) | TBHP(0.2v;0.7d); NFS u.NS (je 0.1;d) | VE, B |
| 2 | VA; d | II (2v + 4d) | TBHP(0.2v;0.7d);NFS u.NS (je 0.2d) | VE, B |
| 3 | VA; d | III (1v + 4d) | TBHP(0.2v;0.7d);NFS u.NS (je 0.2d) | VE, B |
| 4 | VA; d | III (1v + 4d) | TBHP(0.2v;0.7d);NFS u.NS (je 0.3d) | B |
| 5 | VA; d | IV (4; d) | TBHP(0.2v;0.7d);NFS u.NS (je 0.2;d) | VE, B |
| 6 | VA(85) + Veo (7.9) + AA(1) + AS (1) + AMA (0.1) + HEA (5); d | V (4; d) | CHP (0.6;v) | C |
| 7 | VA (99) + AAA (1); d | III (1v; 3d) | PHP (0.7;v) | B |
| 8 | S (40; d) + AB (60; d) | III (1v + 3d) | TBHP (0.2v;0.7d);NFS u.NS (je 0.2;d) | VE, A |
| 9 | S (49.5) + AB (39.5) + OF (10) + Si (1); d | III (1v + 4d) | TBHP (0.2v;0.7d);NFS u.NS (je 0.3;d) | VE, A |
| 10 | VA (15v + 85d); E (50 bar; v) | III (1v + 4d) | TBHP (0.4;NFS u.NS (je 0.2;d) | B |
| 11 | VA (15v + 85d); E (50 bar; v) | V (1v + 4d) | TBHP (0.4;d);NFS u.NS (je 0.2;d) | B |
| 12 | VC (30) + VA (70); d | V (1v + 4d) | TBHP (0.4;d);NFS u.NS (je 0.2;d) | B |
| A | VA (70v; 30d) | V (4); d | TBHP (0.6;v);NFS u.NS (je 0.1;d) | A |
| B | VA; d | V (5); v | TBHP (0.2v;0.7d);NFS u. NS (je 0.4;d) | B |
| C | VA; d | V (1.5) + II (3.5); v | TBHP (0.2v;0.7d);NFS u.NS (je 0.3;d) | C |
| D | VA; d | V (4; d) | TBHP (0.2v;0.7d);NFS (0.5; d) | VE, B |
| E | VA; d | V (2v + 4d) | KPS (0.1; d) | B |
| F | VA; d | V (1v + 4d) | H$_2$O$_2$ (0.1;d);NFS u.NS (je 0.1;d) | — |
| G | VA; d | V (1v + 4d) | DBP (0.4;v);NFS (0.2; d) | VE |

| No. | T (°C.) | pH | FG (%) | R.M. (%) | N.R. (g) | Spreading | Particle size distri./ (mm) | Brookf. viscosity 2 min.$^{-1}$ (mPas) | 10 min.$^{-1}$ (mPas) | 20 min.$^{-1}$ (mPas) |
|---|---|---|---|---|---|---|---|---|---|---|
| 1 | 67 | 7.1 | 40.4 | 1.8 | 7 | clear | 6/950 | 120 | 360 | 520 |
| 2 | 65 | 5.5 | 51.9 | 0.3 | 0.3 | clear | 3/560 | 130 | 76 | 62 |
| 3 | 64 | 6.1 | 46.9 | 1.5 | 0.8 | very clear | 2/250 | 4.750 | 1.650 | 1.100 |
| 4 | 65 | 6.1 | 49.7 | 1.8 | 1.0 | very clear | 2/250 | 10.500 | 3.370 | 2.140 |
| 5 | 68 | 5.5 | 46.8 | 0.6 | — | very clear | 2/2000 | 187.500 | 55.200 | 32.200 |
| 6 | 68 | 6.0 | 51 | 0.4 | — | clear | 3/480 | 10.500 | 3.600 | 2.100 |
| 7 | 68 | 6.2 | 51.5 | 0.3 | — | clear | 3/420 | 9.200 | 3.050 | 1.700 |
| 8 | 70 | 7 | 49.7 | 0.8 | 9 | clear | 4/270 | 775 | 360 | 260 |
| 9 | 65 | 8.3 | 43.1 | 0.2 | 1.1 | very clear | 6/390 | 2.020 | 880 | 630 |
| 10 | 65 | 6.3 | 49.1 | 0.4 | — | clear | — | — | — | — |
| 11 | 65 | 5.3 | 50.3 | 0.6 | — | clear | 3/470 | 9.300 | 3.100 | 1.850 |
| 12 | 65 | 5.8 | 47.1 | 1.2 | — | very clear | — | — | — | — |
| A | 65 | 5.0 | strong coagulation at approx. 19% FG (solid content), experiment stopped | | | | | | | |
| B | 70 | 5.7 | 41.1 | 0.4 | stopped early because of extremely high viscosity | | | | | |
| C | 70 | 4.7 | 51.3 | 0.5 | not measurable | many dots | not measurable | very high viscosity | | |
| D | 60 | 4.7 | stopped because of coagulation after approx. ½ of the metering time | | | | | | | |
| E | 68 | 5.5 | sudden coagulation after ¼ of the metering time | | | | | | | |
| F | 68 | ~5 | coagulated after ¾ of the metering time | | | | | | | |
| G | 68 | 6.4 | product: typical S—polymer | | | | | | | |

The results of the above Table clearly show that the process of the invention results in the preparation of very acceptable aqueous polymer dispersions while the comparative examples resulted in unusable compositions.

Various modifications of the process of the invention may be made without departing from the spirit or scope thereof and it is to be understood that the invention is intended to be limited only as defined in the appended claims.

What we claim is:

1. A process for the preparation of aqueous polymer dispersions consisting essentially of polymerizing compounds with unsaturated ethylenic bonds at a temperature of 10 to 100° C. in the presence of an at least partially water-soluble free-radical initiator and at least one water-soluble protein with the starting mixture containing not more than 40% of the total monomers and the remaining monomer being added by metering during the polymerization, the initiators being at least one member of the group consisting of ketone peroxides and organic hydroperoxides in an amount of at least 30 mmol per kg of total monomer mixture and the amount of protein being at least 3% up to 50% by weight based on the total monomer weight and at least 30% by weight of the total amount of protein is added during the polymerization and the isoelectric point of the protein is not reached or exceeded during polymerization.

2. The process of claim 1 wherein the peroxide initiator is used in combination with a member selected from the group consisting of ascorbic acid and reducing sulfur compounds.

3. The process of claim 1 wherein the initiator is at least one member of the group consisting of alkyl hydroperoxides and aralkyl hydroperoxides.

4. The process of claim 3 wherein the peroxide initiator is used in combination with a member selected from the group consisting of ascorbic acid and reducing sulfur compounds.

5. The process of claim 1 wherein the pH is greater than the isoelectric point of the protein.

6. The process of claim 1 wherein the amount of initiator is at least 45 mmol per kg of total monomer.

7. The process of claim 1 using 15 to 95 mol % of reducing agent based on the initiator.

8. An aqueous polymer dispersion produced by the process of claim 1.

9. A process for the preparation of aqueous polymer dispersions comprising polymerizing compounds with unsaturated ethylenic bonds at a temperature of 10° to 100° C. in the presence of an at least partially water-soluble free-radical initiator and at least one water-soluble protein and adjuvants with the starting mixture containing not more than 40% of the total monomers and the remaining monomer being added by metering during the polymerization, the initiators being at least one member of the group consisting of ketone peroxides and organic hydroperoxides in an amount of at least 30 mmol per kg of total monomer mixture and the amount of protein being at least 3% by weight based on the total monomer weight and at least 30% by weight of the total amount of protein is added during the polymerization and the isoelectric point of the protein is not reached or exceeded during polymerization.

10. An aqueous polymer dispersion produced by the process of claim 9.

11. A process for the preparation of aqueous polymer dispersions comprising polymerizing compounds with unsaturated ethylenic bonds at a temperature of 10° to 100° C. in the presence of an at least partially water-soluble free-radical initiator and at least one water-soluble protein with the starting mixture containing not more than 40% of the total monomers and the remaining monomer being added by metering during the polymerization of ketone peroxides and organic hydroperoxides in an amount of at least 30 mmol per kg of total monomer mixture and water-soluble reducing agents and the amount of protein being at least 3% by weight based on the total monomer weight and at least 30% by weight of the total amount of protein is added during the polymerization and the isoelectric point of the protein is not reached or exceeded during polymerization.

12. An aqueous polymer dispersion produced by the process of claim 11.

* * * * *